*W. A. Ives,*
*Auger.*
*N⁰. 95,803.*  *Patented Oct. 12. 1869.*
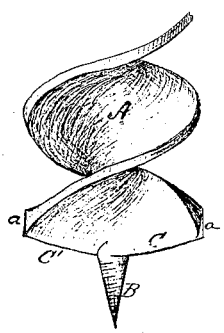
Witnesses
Michael Ryan
A. J. Tibbits
W. A. Ives
Inventor
By his Attorney.
John E. Earle

United States Patent Office.

W. A. IVES, OF NEW HAVEN, CONNECTICUT.

Letters Patent No. 95,803, dated October 12, 1869.

IMPROVEMENT IN AUGER.

The Schedule referred to in these Letters Patent and making part of the same.

*To all whom it may concern:*

Be it known that I, W. A. IVES, of New Haven, in the county of New Haven, and State of Connecticut, have invented a new Improvement in Constructing Augers; and I do hereby declare the following, when taken in connection with the accompanying drawing, and the letters of reference marked thereon, to be a full, clear, and exact description of the same, and which said drawing constitutes part of this specification, and represents a side view of the cutting-end of the auger, looking toward the edge of one of the cutters.

This invention relates to an improvement in auger-bits, the object being to combine a gouge floor-lip with a vertical cutter upon its extreme end.

In order to the clear understanding of my invention, I will proceed to describe the same, as illustrated in the accompanying drawing.

A is the twist of a common auger;
B, the screw-point;
C, the floor-lip upon one side; and
C', a corresponding floor-lip upon the opposite side.

These floor-lips are curved up from the centre, so that the cut commences at the centre, working outward, thus dispensing with the use of the spur-cutters.

I combine with these floor-lips, respectively, a perpendicular or side-cutter, $a$, rising from the floor-lips at their extreme ends.

These, so soon as the floor-cutters have entered the wood, serve to trim off and gather the chips, and prevent the binding or clogging of the cutters, whereby the auger works much easier than the gouge-lip, as heretofore constructed.

I do not wish to be understood as broadly claiming a gouge-lip auger, as such, I am aware, is not new; but What I do claim as my invention, and desire to secure by Letters Patent, is—

In auger-bits, the combination of the gouge floor-lips C C', with their respective side or vertical cutters $a\ a$, connected and arranged substantially as shown and described.

W. A. IVES.

Witnesses:
H. C. WARREN,
GEO. R. NOTT.